US010594235B2

(12) United States Patent
Morse et al.

(10) Patent No.: US 10,594,235 B2
(45) Date of Patent: Mar. 17, 2020

(54) AXIAL FLUX MOTOR WITH BUILT-IN OPTICAL ENCODER

(71) Applicants: David Morse, Stony Point, NY (US); Eric Ginzburg, White Plains, NY (US)

(72) Inventors: David Morse, Stony Point, NY (US); Eric Ginzburg, White Plains, NY (US)

( * ) Notice: Subject to any disclaimer, the term of this patent is extended or adjusted under 35 U.S.C. 154(b) by 0 days.

(21) Appl. No.: 15/468,667

(22) Filed: Mar. 24, 2017

(65) Prior Publication Data

US 2018/0278186 A1    Sep. 27, 2018

(51) Int. Cl.
| | | |
|---|---|---|
| *H02K 29/10* | (2006.01) | |
| *H02P 6/14* | (2016.01) | |
| *H02P 6/17* | (2016.01) | |
| *H02K 11/22* | (2016.01) | |
| *H02K 1/27* | (2006.01) | |
| *H02K 16/02* | (2006.01) | |
| *H02K 21/24* | (2006.01) | |

(52) U.S. Cl.
CPC ............. *H02P 6/17* (2016.02); *H02K 1/2793* (2013.01); *H02K 11/22* (2016.01); *H02K 16/02* (2013.01); *H02K 21/24* (2013.01); *H02K 29/10* (2013.01)

(58) Field of Classification Search
CPC .................................. H02K 29/10; H02P 6/14
See application file for complete search history.

(56) References Cited

U.S. PATENT DOCUMENTS

| | | | |
|---|---|---|---|
| 4,785,241 A | 11/1988 | Abiko et al. | |
| 5,107,107 A | 4/1992 | Osborne | |
| 5,659,217 A | 8/1997 | Petersen | |
| 7,291,953 B1 | 11/2007 | Smith et al. | |
| 9,450,462 B2 | 9/2016 | Bradley | |
| 2011/0140583 A1* | 6/2011 | Rhee ...................... | H02K 29/10 310/68 B |
| 2012/0212167 A1* | 8/2012 | Wu .......................... | H02P 6/14 318/400.13 |
| 2014/0042852 A1 | 2/2014 | Lee et al. | |
| 2015/0354992 A1* | 12/2015 | Murokita ........... | G01D 5/34715 318/640 |

FOREIGN PATENT DOCUMENTS

EP        0492621 B1     10/1995

OTHER PUBLICATIONS

PCT International Search Report and Written Opinion, dated Jun. 8, 2018.

* cited by examiner

*Primary Examiner* — Cortez M Cook
(74) *Attorney, Agent, or Firm* — Mandelbaum, Silfin, Economou LLP

(57) ABSTRACT

An axial flux motor has a rotor mounted about an axis of rotation. Permanent magnets are mounted on a first axial face of the rotor and a predetermined encoder pattern is provided on the surface of a second axial face of the rotor. A stator is positioned on one side of the rotor adjacent to the first axial face of the rotor. A sensor is mounted on the other side of the rotor adjacent to the second axial face of the rotor. The sensor outputs signals corresponding to the encoder pattern on the surface of the second axial face of the rotor. A motor control system is coupled to receive the signals from the sensor and calculates a speed of rotation of the rotor based on the signals from the sensor. In addition, the motor control system may calculate rotor position information, relative or absolute, based on the encoder pattern.

21 Claims, 7 Drawing Sheets

AXIAL FLUX MOTOR WITH BUILT-IN OPTICAL ENCODER

FIELD

This application relates to axial flux motors, particularly axial flux motors having an outer rotor geometry.

BACKGROUND

Axial flux permanent magnet motors generally have high torque density (torque rating per unit volume) and can be advantageous for low speed, high torque applications, including direct drive. However, controlling motors at low speed can prove more difficult than at higher speeds because more time passes between position feedback signals. This usually means that high resolution position feedback is desirable to facilitate control.

Normally, this is done with a separate optical encoder or similar device. An optical encoder, as a separate device later installed on the motor, comes with its own mechanical constraints which may impose new design constraints on the overall motor/optical encoder assembly. Additional consideration must be taken for proper alignment.

Accordingly, there is a particular need for an improved axial flux motor which overcomes the problems recited above.

SUMMARY

In a first aspect, an axial flux motor has a rotor mounted about an axis of rotation. The rotor has a first axial face and a second axial face. Permanent magnets are mounted on the first axial face and a predetermined encoder pattern is on the surface of the second axial face. The motor also has a stator positioned on one side of the rotor adjacent to the first axial face of the rotor. The motor also has a sensor is mounted on the other side of the rotor adjacent to the second axial face of the rotor. The sensor outputs signals corresponding to the encoder pattern on the surface of the second axial face of the rotor. The motor also has a motor control system coupled to receive the signals from the sensor.

In one further embodiment, the predetermined encoder pattern is a series of equally-spaced light and dark surfaces in a circle and the sensor is an optical emitter-detector pair. The motor control system may calculate a speed of rotation of the rotor based on the signals from the sensor. Still further, the predetermined encoder pattern may have an index indicating a reference position of the rotor. The motor control system may calculate a speed of rotation of the rotor and a relative position of the rotor based on the signals from the sensor.

In another further embodiment, the predetermined encoder pattern is a plurality of concentric patterns arranged to provide an output code providing an absolute position location of the rotor. The sensor has an optical emitter-detector pair for each of the plurality of concentric patterns. The motor control system may calculate a speed of rotation of the rotor and an absolute position of the rotor based on the signals from the sensor. Still further, the sensor has optical emitter-detector pairs for providing commutation signals to the motor control system.

In yet another further embodiment, the permanent magnets may be mounted on the first axial face of the rotor in a Halbach array pattern.

In a still further embodiment, the motor has a second rotor mounted about the axis of rotation and having a first axial face and a second axial face. Permanent magnets are mounted on the first axial face and a predetermined encoder pattern is on the surface of the second axial face. The motor also has a second stator positioned on one side of the second rotor adjacent to the first axial face of the second rotor. The motor also has a second sensor mounted on the other side of the second rotor adjacent to the second axial face of the rotor. The second sensor outputs signals corresponding to the encoder pattern on the surface of the second axial face of the second rotor. The motor control system is also coupled to receive the signals from the second sensor.

In a second aspect, an axial flux motor has a rotor mounted about an axis of rotation. The rotor has a first axial face and a second axial face. The rotor is formed from permanent magnets and has a predetermined encoder pattern on the surface of the second axial face. The motor has a stator positioned on one side of the rotor adjacent to the first axial face of the rotor. The motor has a sensor mounted on the other side of the rotor adjacent to the second axial face of the rotor. The sensor outputs signals corresponding to the encoder pattern on the surface of the second axial face of the rotor. The motor has a motor control system coupled to receive the signals from the sensor.

In a further embodiment, the motor has a second rotor mounted about the axis of rotation. The second rotor has a first axial face and a second axial face. The second rotor is formed from permanent magnets and has a predetermined encoder pattern on the surface of the second axial face. The motor has a second stator positioned on one side of the rotor adjacent to the first axial face of the second rotor. The motor has a second sensor mounted on the other side of the second rotor adjacent to the second axial face of the rotor. The second sensor outputs signals corresponding to the encoder pattern on the surface of the second axial face of the second rotor. The motor control system is also coupled to receive the signals from the second sensor.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

All embodiments of the present disclosure have the common elements of an axial flux permanent magnet motor, including: (1) one or more stators; (2) one or more rotors; (3) windings; (4) one or more bearings; and (5) a motor housing. The operation of such elements in an axial flux permanent magnet motor is known to those of skill in the art and are thus not described in detail herein. An axial flux motor is a device that produces rotational motion from the interaction of magnetic fields that are mainly concentrated parallel to the axis of rotation of the motor.

Briefly, in accordance with one embodiment of the present disclosure, an axial flux motor includes at least one rotor disk coupled to a rotatable shaft, at least one permanent magnet supported by the at least one rotor disk, at least one stator extension positioned in parallel with the at least one rotor disk, at least two molded iron pole elements attached to the at least one stator extension and facing the at least one permanent magnet, and at least two electrical coils, each wrapped around a respective one of the at least two molded iron pole elements. A pattern of light reflective and light-absorbent surfaces is provided on an outside (i.e., opposite to the stator) face of the at least one rotor disk. At least one light emitter/light detector pair are provided which are oriented opposite and facing the pattern of light reflective and light-absorbent and which are anchored to an inside surface of the motor casing. Together, the light emitter/light detector pair and light-absorbent/light-reflective surface of the rotor disk form a reflective optical encoder, or rotor encoder disk.

Figure 1:
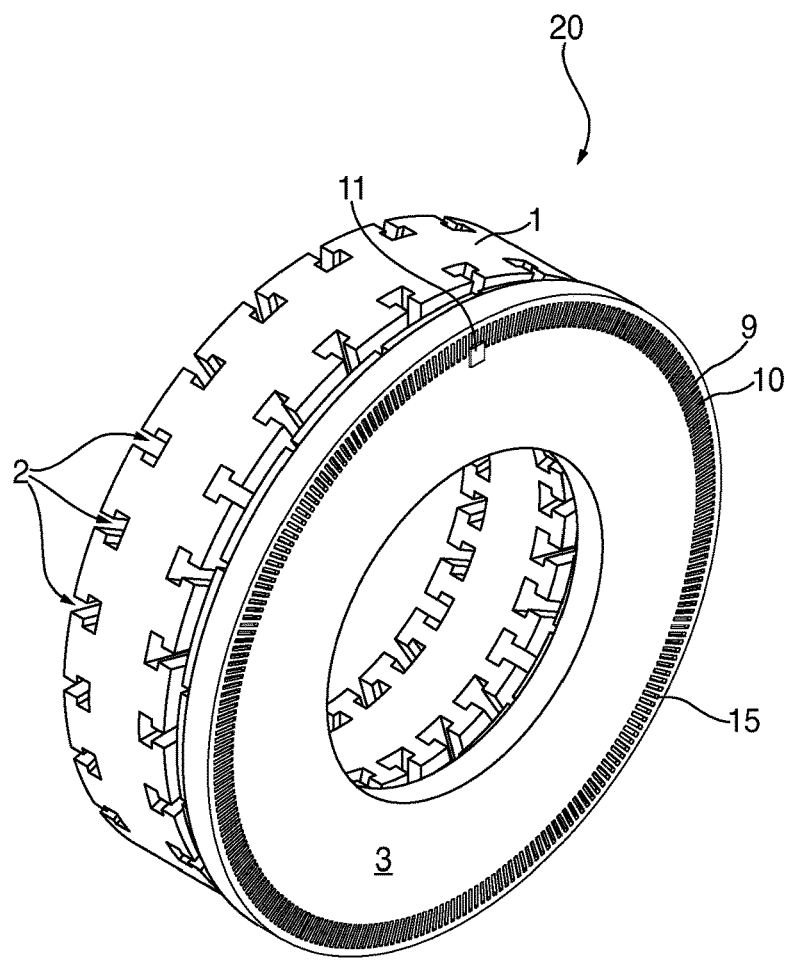
FIG. 1 is an isometric view of an embodiment of an axial flux motor having a built-in incremental encoder according to an aspect of the present disclosure.
Figure 2:
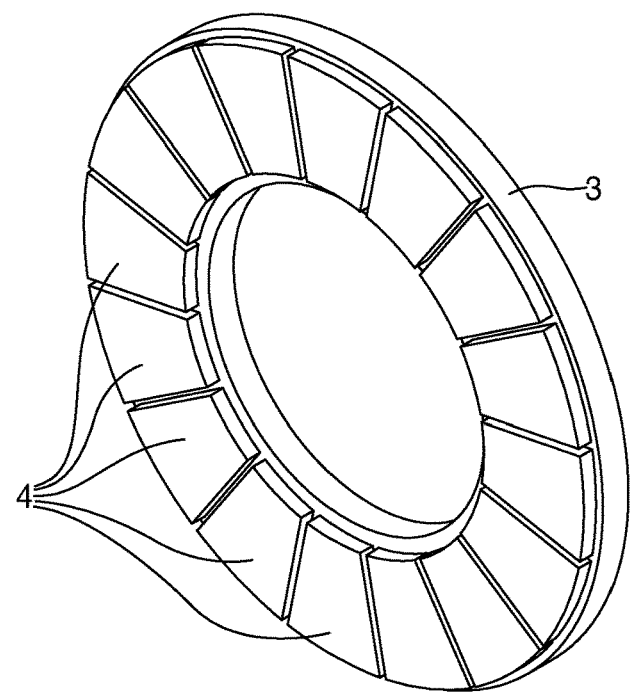
FIG. 2 is an isometric side view of a rotor disk including permanent magnets according to an aspect of the present disclosure.

Referring now to FIG. 1, an embodiment of an axial flux motor 20 having a built-in incremental encoder is shown. For clarity, the bearing shaft, windings (coils), and additional coupled rotors are not shown. In addition, in FIG. 1, the optical emitter-detector mounting and signal routing are also not shown. Axial flux motor 20 includes a stator 1 which is ring-shaped and has slots 2 for electrical coils. The electrical coils (not shown, for clarity) are wound such that, in operation, a magnetic field is produced that extends parallel to the axis of rotation of axial flux motor 20. By controlling the direction and magnitude of the electric current flowing in the electrical coils, the pattern of the magnetic fields produced in stator 1 is made to rotate, thus producing rotation in an adjoining rotor-encoder disk 3. Rotor-encoder disk 3 (rotor 3) is ring shaped and, as shown in FIG. 2, houses permanent magnets 4 which interact with the magnetic field produced by stator 1 to produce rotational motion. The magnetic field of the permanent magnets 4 is concentrated to extend parallel to the axis of rotation. FIG. 2 shows an isometric view of the rotor disk 3 from the side having permanent magnets 4 installed thereon.

Figure 3:
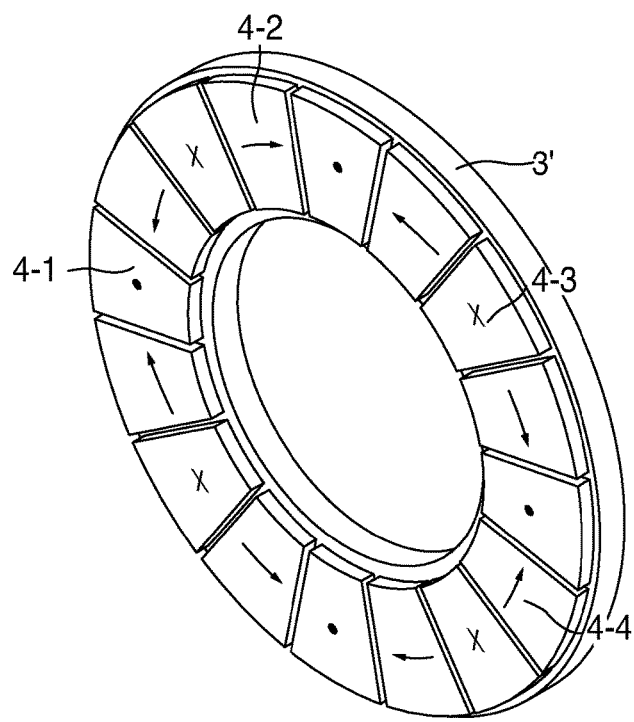
FIG. 3 is an isometric side view of an optical encoder disk including a Halbach array pattern according to an aspect of the present disclosure.

In an optional embodiment shown in FIG. 3, a Halbach array is used to strengthen the magnetic fields on the side of the rotor 3' facing the stator 1, while weakening the fields on the opposing side of the rotor 3' (which generate virtually no rotation). In particular, in FIG. 3 three different type of magnets 4-1, 4-2, 4-3 and 4-4 are deployed around the rotor-encoder disk 3' in a predetermined pattern to concentrate the magnetic field strength almost entirely on the side of rotor-encoder disk 3' facing stator 1. The example shown in FIG. 3 is an eight pole rotor with a Halbach array with each permanent magnet having predetermined field directions. Any number of poles can be utilized, with or without a Halbach array, to suit the desired application.

Figure 4:
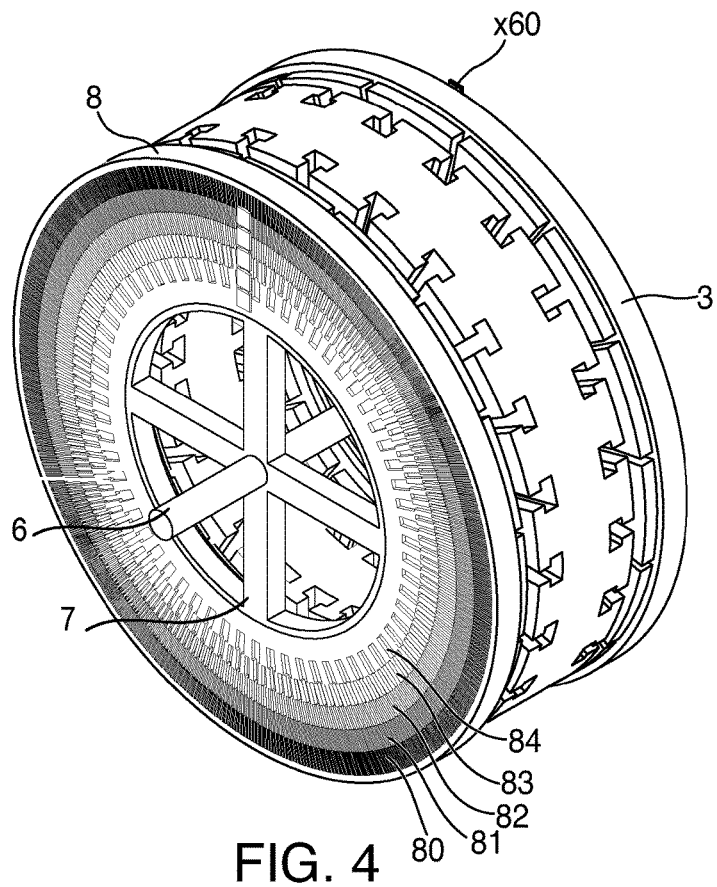
FIG. 4 is an isometric view of a further embodiment of an axial flux motor showing an additional rotor encoder disk according to an aspect of the present disclosure.

As shown in FIG. 4, rotor encoder disk 3 (or rotor encoder disk 3') is coupled to a shaft 6 by structural members 7. FIG. 4 also shows a further embodiment with an additional rotor encoder disk 8, as discussed below.

As shown in the different embodiments of FIGS. 1, 5, 6, and 7, rotor-encoder disk 3 includes patterns of light-absorbent surfaces 9 and light reflective surfaces 10 that are built into the surface of rotor-encoder disk 3 that faces away from stator 1. The light-absorbent surfaces 9 and light reflective surfaces 10 form concentric patterns that comprise a reflective optical encoder pattern (i.e., an encoder pattern). In FIG. 1, a sensor formed from optical emitter-detector pairs 11 is mounted directly opposite the reflective encoder pattern on rotor encoder disk 3 to emit light and detect whether the emitted light is reflected (by a reflective surface) or absorbed (by an light-absorbent surface). Emitter-detector pairs 11 are mounted stationary relative to the rotor-encoder disk 3, such that as the rotor-encoder disk 3 rotates, the emitter-detector pairs 11 generate an electrical signal corresponding to the encoder pattern encoded on rotor-encoder disk 3.

In FIG. 1, an incremental encoder pattern 15 is used to provide rotational speed feedback. The incremental encoder pattern 15 has an alternating high resolution pattern of equally sized light-absorbent surfaces 9 and light-reflective surfaces 10. Each change from a light-absorbent surface 9 to a reflective surface 10 (and vice versa) causes an incremental step in the digital signal provided to a motor control system (not shown). As the rotor-encoder disk 3 rotates, a digital signal is produced from the optical emitter-detector pair 11 having a frequency proportional to the speed of rotation.

Figure 5:
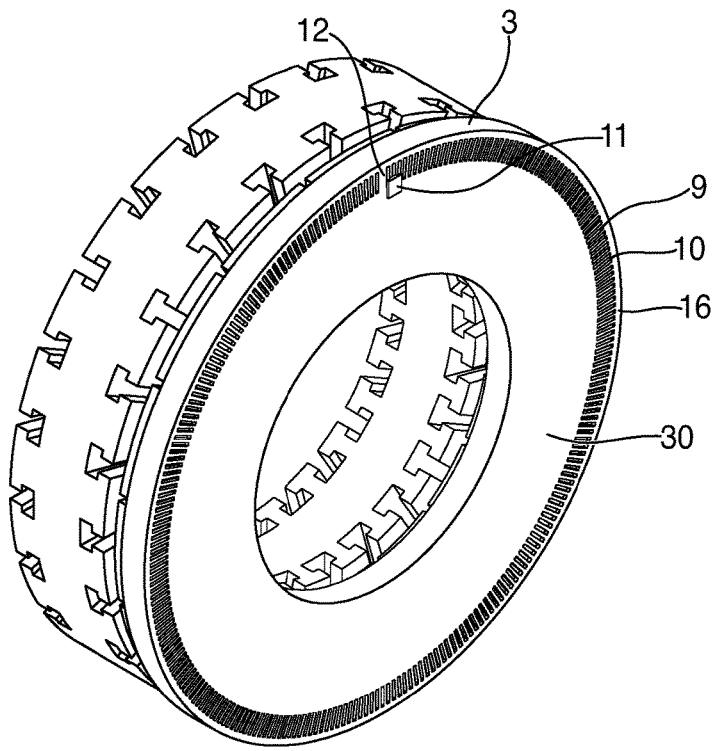
FIG. 5 is an isometric view of an embodiment of an axial flux motor having a built-in incremental encoder and an index according to an aspect of the present disclosure.

FIG. 5 shows an embodiment having an incremental encoder pattern 16 with an added index 12 at a specific predefined position on rotor-encoder disk 30. The sudden change in signal caused by index 12 is used by the motor control system to identify a reference position. The digital signal produced by the incremental encoder pattern can then be counted by the motor control system to determine the actual position relative to that reference positon. In a further embodiment, the optical-emitter detector pairs 12 may include an additional detector for determining the direction of rotation and/or the presence of an index which can provide added functionality for certain applications (e.g., counting turns from a reference position for a motor in a robotics or computer numerical control application.).

Figure 6:
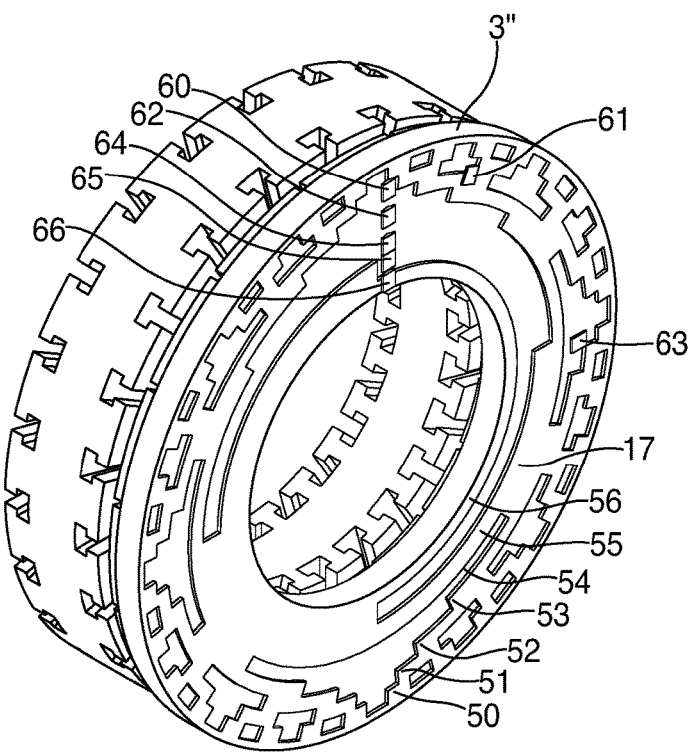
FIG. 6 is an isometric view of a second embodiment of an axial flux motor having a built-in absolute encoder according to an aspect of the present disclosure.

FIG. 6 shows an embodiment of a rotor 3" having an absolute encoder pattern 17 used for speed and absolute position feedback. The absolute encoder pattern 17 is made up of multiple concentric patterns of light-absorbent surfaces 9 and reflective surfaces 10, where each concentric pattern represents one bit in a code that represents the rotor position. Each discrete position has a unique code, over a certain angle of rotor-encoder disk travel. In the example in FIG. 6, each position over the full 360 degrees has a unique code, with $360/(2^7)$, or 2.8125 degrees of precision. However, some applications may only require absolute position over a fraction of a rotation, for example 30 degrees. For such an application, the pattern in each concentric circle 50, 51, 52, 53, 54, 55, 56 may repeat every 30 degrees. The absolute encoder pattern is designed such that only one bit changes between adjacent positions (i.e., a Gray code). Emitter-detector pairs 60, 61, 62, 63, 64, 65, 66 are mounted opposite each concentric pattern 50, 51, 52, 53, 54, 55, 56 to each generate one bit of the position code. The optical emitter-detector pairs 60, 61, 62, 63, 64, 65, 66, may each be positioned a set angle ahead or behind a desired point on the stator to add intentional phase lead or lag for control purposes. Additionally, optical emitter-detector pairs 60, 61, 62, 63, 64, 65, 66 may be positioned in multiples of 360 electrical degrees ahead or behind a desired point to suit the application without adding phase lead or lag (for example to fit all the emitter-detectors in the available space). All of the bits together generate the position code. The motor control system that receives the signals from the optical emitter-detector pairs 60, 61, 62, 63, 64, 65, 66 can then use this absolute position to determine speed. Another benefit of this absolute position embodiment is that the position is known at all times, as opposed to when the incremental encoder with an index embodiment (FIG. 5) is employed, because the rotor-encoder disk must reach a reference point before position can be determined. The number of concentric patterns and corresponding number of optical emitter-detectors utilized determines the number of bits available in the position signal for the motor control system and the resolution of the position signal. In the example depicted in FIG. 3, there are seven concentric circles and thus seven bits, however, the number of bits are arbitrary and can be chosen to suit the application.

Figure 7:
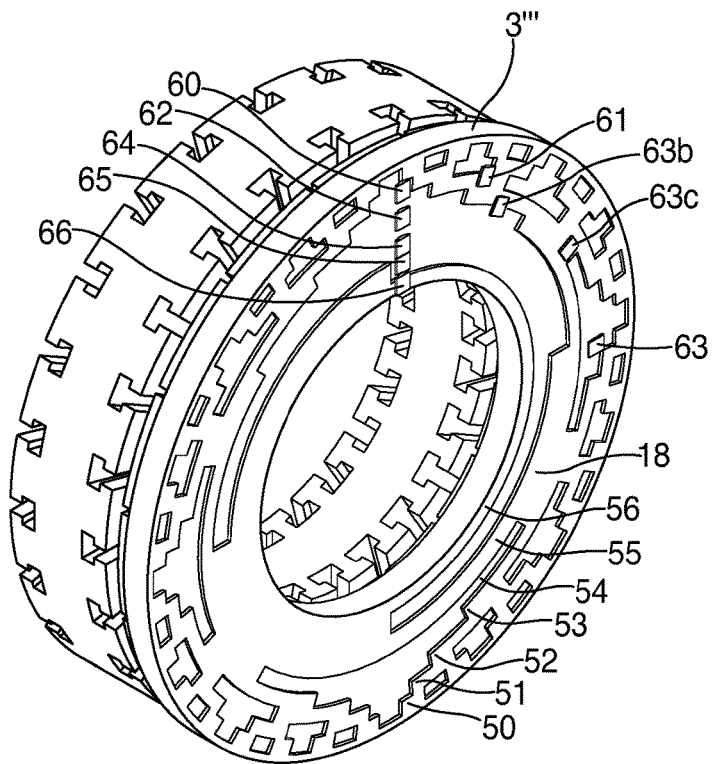
FIG. 7 is an isometric view of a third embodiment of an axial flux motor having a built-in absolute encoder and additional emitter-detector pairs to generate commutation signals according to an aspect of the present disclosure.
Figure 8:
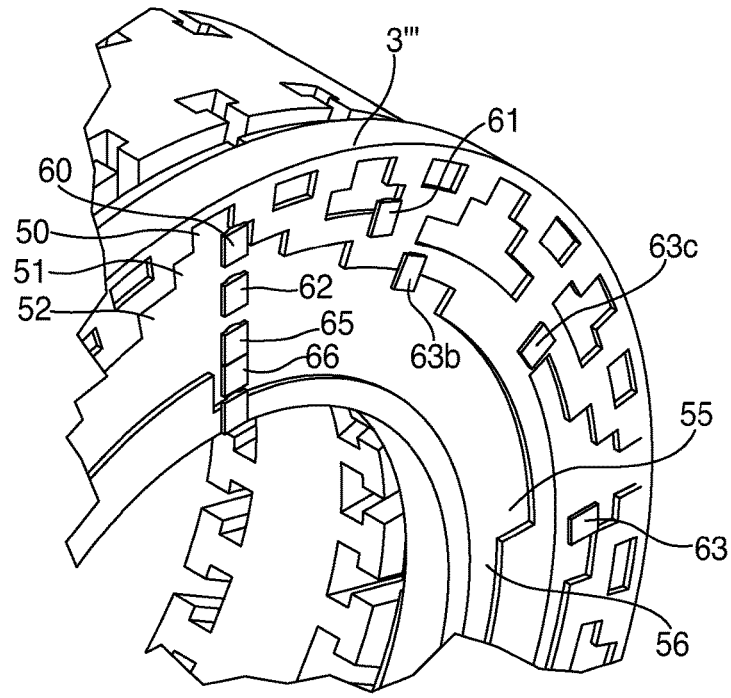
FIG. 8 is an isometric detailed view of a rotor disk according to an aspect of the present disclosure.
Figure 9:
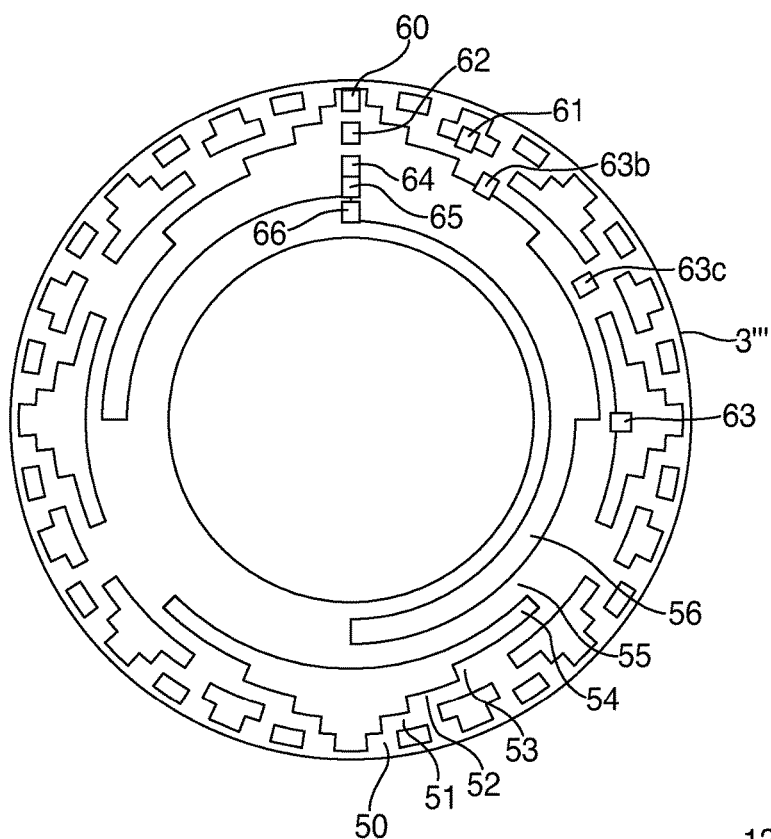
FIG. 9 is a front view of a rotor disk according to an aspect of the present disclosure.

FIG. 7 shows an embodiment of a rotor 3''' with an absolute encoder pattern 18 with added optical emitter-detector pairs 63, 63b, 63c to provide commutation signals based on the information included in one of the concentric rings in the absolute encoder pattern. The added optical emitter-detector pairs 63, 63b, 63c are placed opposite a concentric pattern 53 where the angle covered by each reflective or light-absorbent surface is equal to the angle between two rotor poles or 180 electrical degrees. In the example in FIG. 7, the angle is 45 mechanical degrees. Three optical emitter-detector pairs 63, 63b, 63c are placed at 0+l*360, 120+m*360 electrical degrees and 240+n*360 electrical degrees, where l, m, and n are positive integers that are less than the number of rotor poles divided by 2. These three emitter-detector pairs 63, 63b, and 63c together generate a signal for the motor control system to perform 120 degree commutation. In this case, emitter-detector pair 63 also doubles as one bit of the absolute encoder position. The spacing of the optical-emitter detectors 63, 63b, 63c in this embodiment is more clearly depicted in FIGS. 8 and 9. This arrangement is similar to Hall effect sensors that are used in other types of motors to generate signals for 120 degree motor commutation. Alternatively, when 60 degree motor commutation is desired, the three optical emitter-detectors 63, 63b, 63c can be placed at 0+l*360, 60+m*360, and 120+n*360 degrees of separation.

Figure 10:
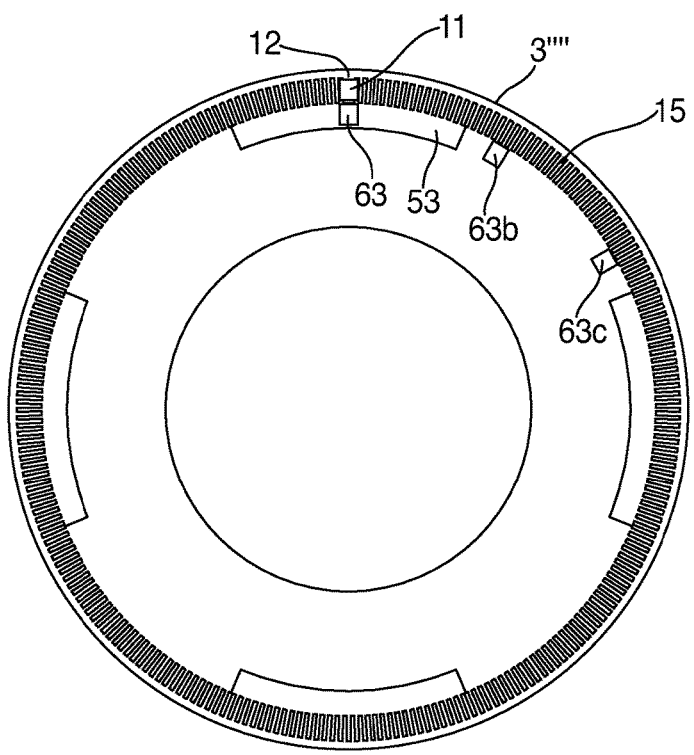
FIG. 10 is a front view of a rotor disk according to an aspect of the present disclosure, with an incremental encoder, index, and commutation pattern.

FIG. 10 shows an alternate embodiment of a rotor 3'''' with an incremental encoder pattern 15, an optional index 12, and a commutation pattern 53. Three optical emitter-detector pairs 63, 63b, and 63c are all spaced similar to the description above to provide a similar commutation function for the incremental encoder with or without an index 12.

Figure 11:
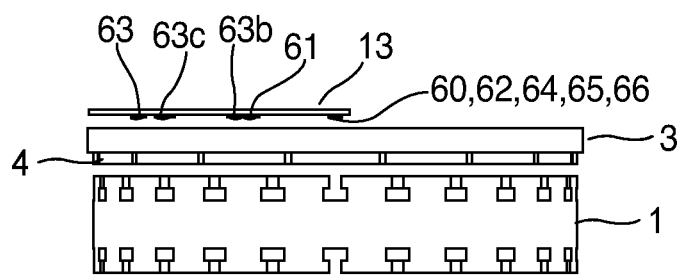
FIG. 11 is a side, cross-sectional, detailed view of an axial flux motor according to an aspect of the present disclosure.

FIG. 11 shows a cross sectional, detailed view of a stator 1, the rotor encoder disk 3, and several optical emitter-detector pairs 60, 61, 62, 63, 64, 65, 66. The mounting of the optical emitter-detector pairs 60, 61, 62, 63, 64, 65, 66 is dependent on the type of signal leads, size, and construction of the optical emitter-detector pair devices. The example shown in FIG. 11 uses surface mount emitter-detector pairs attached to a circuit board 13. The circuit board 13 is attached to the motor housing (not shown) while the signal leads of the optical emitter-detector pairs (not shown) are routed to the motor control system with appropriate connectors and cabling.

FIG. 4 shows an alternative embodiment where an additional rotor encoder disk 8 is utilized to provide additional concentric patterns 80, 81, 82, 83, 84 with corresponding optical emitter-detector pairs 90, 91, 92, 93, 94, providing additional bits to the overall position signal. This provides increased resolution on the overall position signal between the two rotors 3, 8. Both rotor encoder disks shown in FIG. 4 are coupled to the same shaft 6. Both rotors provide torque and rotate together. Additional rotor encoder disks and stators, beyond the two pairs shown in FIG. 4, can be utilized in applications requiring added torque and further increased position resolution.

Figure 12:
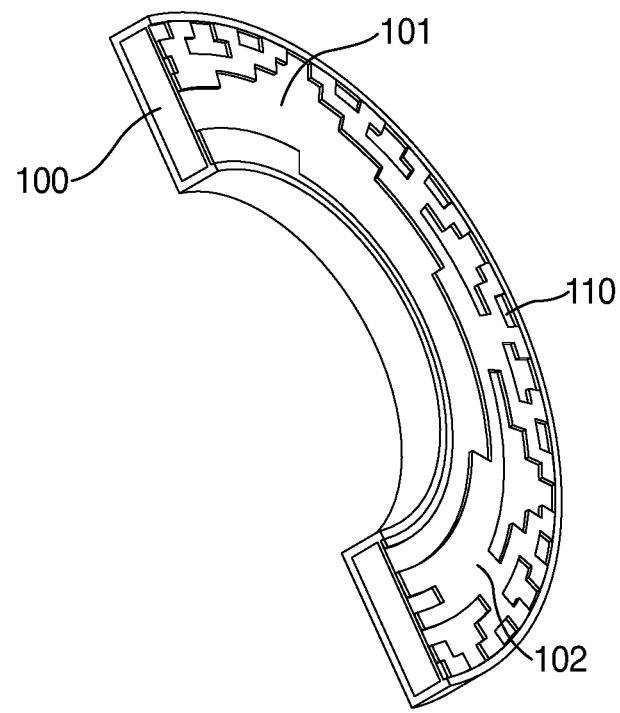
FIG. 12 is an isometric side view of a portion of a rotor encoder disk formed from solid permanent magnet material according to another further embodiment of the present disclosure.

FIG. 12 shows a cross section of an optional embodiment of the rotor encoder disk 100 where the disk 100 itself is a solid permanent magnet with the desired magnetic flux arrangement created during manufacture. This solid disk 100 of permanent magnet material has multiple layers of coating that are usually applied with electroplating. In this embodiment, the layer of coating just beneath the surface 101 is a conductive and light reflective material, while the top most layer of coating 102 is a light-absorbent material that is suitable for one or more manufacturing methods: to be applied through electroplating, and/or to be removed with electrochemical etching, or precision machining. The encoder pattern 110 on disk 100 is formed during manufacturing by controlling the deposition and removal of the outermost layer of coating to leave light-absorbent material in the desired pattern on one surface of the rotor encoder disk. Another embodiment, not shown, is similar except the top most layer is a light reflective material and the underlying layer is light-absorbent material.

Figure 13:
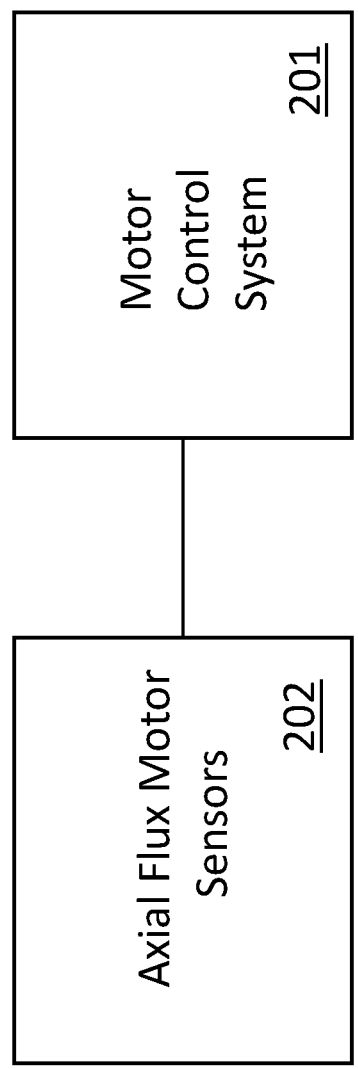
FIG. 13 is a block diagram of a motor control system for an axial flux motor having according to an aspect of the present disclosure.

Referring now to FIG. 13, a block diagram shows motor control system 201 coupled to the axial flux motor sensors 202 (i.e., the optical emitter-detector pairs shown in the various embodiments disclosed above). The motor control system receives the signals from the axial flux motor sensors 202 and calculates one or more of speed of rotation, reference position, absolute position, and commutation signals based thereon as discussed herein.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. An axial flux motor comprising:
    a rotor mounted about an axis of rotation, the rotor having a ring shape and comprising a first axial face, a second axial face, and permanent magnets, the rotor having a predetermined encoder pattern on an integral surface of the second axial face;
    a stator positioned on a first side of the rotor adjacent to the first axial face of the rotor;
    a sensor positioned adjacent to a second side of the rotor that is opposite to the first side thereof, the sensor adjacent to the second axial face of the rotor, the sensor for sensing and outputting signals corresponding to the encoder pattern on the surface of the second axial face of the rotor; and
    a motor control system coupled to receive the signals from the sensor.

2. The motor of claim 1, wherein the permanent magnets are mounted on the first axial face.

3. The motor of claim 2, wherein the predetermined encoder pattern comprises a series of equally-spaced light and dark surfaces in a circle and wherein the sensor comprises an optical emitter-detector pair.

4. The motor of claim 3, wherein the motor control system calculates a speed of rotation of the rotor based on the signals from the sensor.

5. The motor of claim 3, wherein the predetermined encoder pattern further comprises an index indicating a reference position of the rotor.

6. The motor of claim 5, wherein the motor control system calculates a speed of rotation of the rotor and a relative position of the rotor based on the signals from the sensor.

7. The motor of claim 2, wherein the predetermined encoder pattern comprises a plurality of concentric patterns arranged to provide an output code providing an absolute position location of the rotor and wherein the sensor comprises an optical emitter-detector pair for each of the plurality of concentric patterns.

8. The motor of claim 7, wherein the motor control system calculates a speed of rotation of the rotor and an absolute position of the rotor based on the signals from the sensor.

9. The motor of claim 7, wherein the sensor further comprises optical emitter-detector pairs for providing commutation signals to the motor control system.

10. The motor of claim 2, wherein the permanent magnets are mounted on the first axial face of the rotor in a Halbach array pattern.

11. The motor of claim 2, further comprising:
    a second rotor mounted about an axis of rotation and having a ring shape, the second rotor comprising a first axial face and a second axial face and having permanent magnets mounted on the first axial face and a predetermined encoder pattern on an integral surface of the second axial face;
    a second stator positioned on a first side of the second rotor adjacent to the first axial face of the second rotor;
    a second sensor positioned adjacent to a second side of the second rotor that is opposite to the first side thereof, the second sensor adjacent to the second axial face of the rotor, the second sensor for sensing and outputting signals corresponding to the encoder pattern on the surface of the second axial face of the second rotor; and
    wherein the motor control system is coupled to receive the signals from the second sensor.

12. The motor of claim 1, wherein the rotor is formed from permanent magnets.

13. The motor of claim 12, wherein the predetermined encoder pattern comprises a series of equally-spaced light and dark surfaces in a circle and wherein the sensor comprises an optical emitter-detector pair.

14. The motor of claim 13, wherein the motor control system calculates a speed of rotation of the rotor based on the signals from the sensor.

15. The motor of claim 13, wherein the predetermined encoder pattern further comprises an index indicating a reference position of the rotor.

16. The motor of claim 15, wherein the motor control system calculates a speed of rotation of the rotor and a relative position of the rotor based on the signals from the sensor.

17. The motor of claim 12, wherein the predetermined encoder pattern comprises a plurality of concentric patterns arranged to provide an output code providing an absolute position location of the rotor and wherein the sensor comprises an optical emitter-detector pair for each of the plurality of concentric patterns.

18. The motor of claim 17, wherein the motor control system calculates a speed of rotation of the rotor and an absolute position of the rotor based on the signals from the sensor.

19. The motor of claim 17, wherein the sensor further comprises optical emitter-detector pairs for providing commutation signals to the motor control system.

20. The motor of claim 12, wherein the permanent magnets are mounted on the first axial face of the rotor in a Halbach array pattern.

21. The motor of claim 12, further comprising:
    a second rotor mounted about an axis of rotation, the second rotor having a ring shape and comprising a first axial face and a second axial face, the second rotor formed from permanent magnets and having a predetermined encoder pattern on an integral surface of the second axial face;
    a second stator positioned on a first side of the second rotor adjacent to the first axial face of the second rotor;
    a second sensor positioned adjacent to a second side of the second rotor that is opposite to the first side thereof, the sensor adjacent to the second axial face of the rotor, the second sensor for sensing and outputting signals corresponding to the encoder pattern on the surface of the second axial face of the second rotor; and
    wherein the motor control system is coupled to receive the signals from the second sensor.

* * * * *